M. C. IBANEZ.
MAP INDEX.
APPLICATION FILED APR. 10, 1917.
1,276,657.
Patented Aug. 20, 1918.
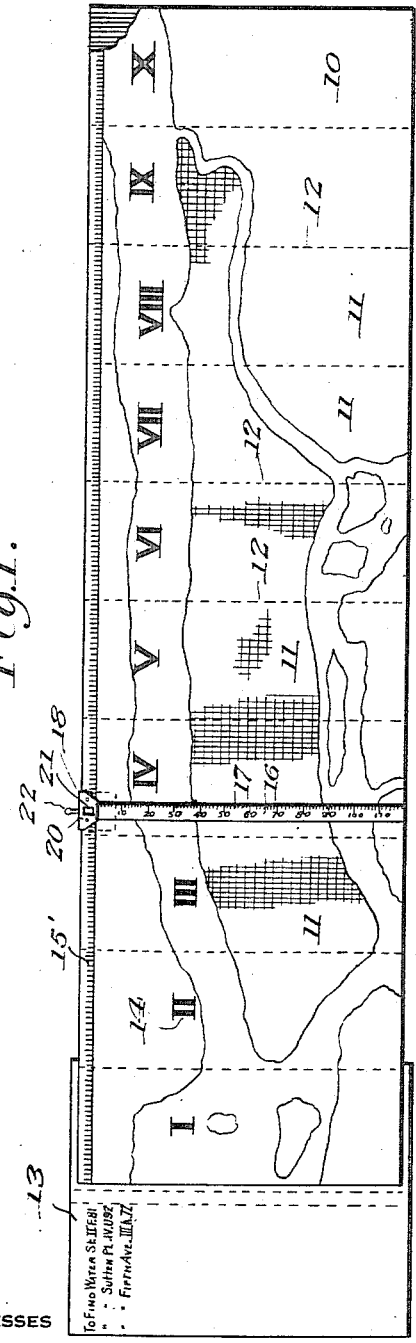
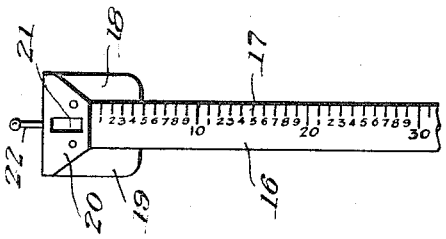
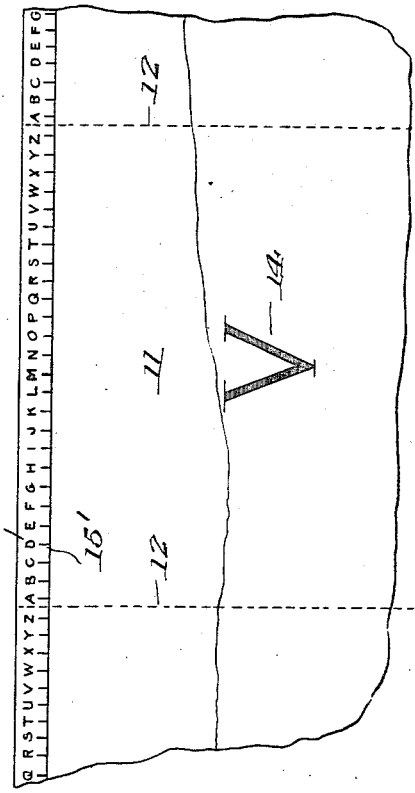
INVENTOR
Manuel C. Ibanez.
BY Victor J. Evans
ATTORNEY
WITNESSES
Frederick W. Ely

UNITED STATES PATENT OFFICE.

MANUEL C. IBANEZ, OF NEW YORK, N. Y.

MAP-INDEX.

1,276,657.

Specification of Letters Patent.   Patented Aug. 20, 1918.

Application filed April 10, 1917.   Serial No. 161,096.

*To all whom it may concern:*

Be it known that I, MANUEL C. IBANEZ, a citizen of Mexico, residing at New York, in the county of New York and State of New York, have invented new and useful Improvements in Map-Indexes, of which the following is a specification.

This invention relates to maps and especially to means for quickly, conveniently and accurately locating any desired point upon a map.

The object of the present invention is to provide a map which may be folded into sections in order that it may be conveniently carried in the pocket and to provide means whereby the said map may be opened or unfolded to expose any desired section for the purpose of locating thereon the desired point.

A further object is to provide means cooperating with the indicia upon each of said sections, so that when the desired section is exposed any point thereon may be quickly and accurately located, thereby obviating the necessity of unfolding a large and bulgy map.

A still further object is to provide a map capable of being folded to form separate sections, with means for determining the section upon which a particular point is located and when such section is determined of providing means coöperating with any of said sections and with the indicia thereon for locating any given point.

With the above and other objects in view the invention consists of a map folded in a manner to provide a plurality of sections capable of being separately exposed, of distinguishing indicia for each of said sections, duplicate marginal indicia for each of said sections and means capable of being removably secured to each of said sections, for locating thereon any given point.

In the drawings:—

Figure 1 is a view of the map showing the same folded longitudinally so as to reduce the exposed area one half, the said half being capable of being folded as indicated in dotted lines and illustrating in connection therewith the improved point locating means;

Fig. 2 is an enlarged fragmentary view of a portion of the map illustrating the marginal indicia for each of the sections; and Fig. 3 is a similar view of the removable tape.

Referring in detail to the drawings, the invention comprises a map adapted to be folded longitudinally to provide two half sections, one of which is shown in Fig. 1 of the drawings and is indicated by the numeral 10. These sections 10 are further divided to provide a plurality of sections 11, which are adapted to be folded on the dotted lines indicated at 12. The folded cover 13 is adapted to be secured to the map and when the sections 11 are folded upon the dotted lines 12 and the cover folded thereon, the whole will present the appearance of a book, of a size capable of being conveniently carried in the pocket for ready reference.

Each of the sections 11 are provided with distinguishing indicia, which in the present instance is illustrated at 14 and is in the form of roman numbers. The sections 11 are further provided with marginal indicia 15 which is shown in the present instance in the form of letters of the alphabet arranged from A to Z. Located below and registering with each of the letters are marks or graduations 15' for a purpose to be presently described.

Adapted to coöperate with the map indicia 15, is a tape 16, which is provided along one of its marginal edges with indicia 17 in the form of graduations. Upon one end of the tape 16 there is provided a clip 18, preferably formed of spring metal and comprising a plate 19 and a substantially parallel tongue 20. The tape 16 is adapted to be secured beneath this tongue and may or may not cover a sight opening 21 provided therein. Should this tape be secured in a manner to cover this opening, it will be composed of transparent material, the indicia 17 being provided by securing under the said tape a strip of paper or other material having imprinted thereon the indicia 17. For the purpose of conveniently handling the tape the clip 18 is provided with a finger piece 22, by means of which it may be readily engaged with any of the sections 11, as shown in Fig. 1.

The cover 13 is imprinted or otherwise secured thereon are directions for manipulating the clip 18 for the purpose of locating any desired point upon the map, for example to find Water St., the tape 16 is adjusted by means of the clip 18 to section 2, which is indicated by the roman numeral thereon. The clip 18 is then moved along the margin of the map until the letter F is exposed through the sight opening 21, the indicating mark 15′ being centrally located through this sight opening. By locating the point 81 on the tape 16 it will be found that Water St. is at this point on the map. To find 5th Avenue the tape is attached to section 3 over the letter K and 72 is located on the tape.

By arranging the map folded in the manner shown any of the sections may be exposed separately without unfolding the entire map, thereby greatly facilitating the use of the same. As each of the sections are provided with the same marginal indicia, the tape 16 will coöperate with any of the sections.

It is of course understood that the invention is not limited to a folded map, but may be used in connection with an unfolded map or a map comprised of separate sections, it being only necessary to provide each of the sections with a distinguishing mark and with the same marginal indicia. By providing separate sections, the map may be carried within an envelope or pocket and the desired section removed and used as above described. The right is reserved therefore to make these changes, or any others that may suggest themselves, within the scope of the appended claim. It is also understood that instead of the tape 16 can be used a card which is provided along one of its marginal edges with indicia in the form of graduations. In this case the card will not have any clip and must be held by hand.

Having described the invention, what is claimed, is;

The combination with a map provided with marginal indicia thereon, of a tape also with indicia thereon for coöperation with the marginal indicia, a spring clip carried by the tape and frictionally engageable with the marginal edge of the map, said clip having an opening therein to dispose a character of the marginal indicia.

MANUEL C. IBANEZ.